(12) United States Patent
Rigaud et al.

(10) Patent No.: US 9,013,290 B2
(45) Date of Patent: Apr. 21, 2015

(54) METHOD FOR LIGHTING UP A LUMINOUS SAFETY ACCESSORY

(75) Inventors: David Rigaud, Velaux (FR); Jean-Michel Pfrimmer, Lampertheim (FR)

(73) Assignee: Kido Sports Co., Ltd., Seoul (KR)

( * ) Notice: Subject to any disclaimer, the term of this patent is extended or adjusted under 35 U.S.C. 154(b) by 353 days.

(21) Appl. No.: 13/558,129

(22) Filed: Jul. 25, 2012

(65) Prior Publication Data

US 2013/0114247 A1    May 9, 2013

(30) Foreign Application Priority Data

Nov. 3, 2011   (FR) .................................. 1000128901

(51) Int. Cl.
| | | |
|---|---|---|
| B60Q 1/00 | (2006.01) |
| A42B 3/04 | (2006.01) |
| B60Q 1/26 | (2006.01) |
| B60Q 1/44 | (2006.01) |

(52) U.S. Cl.
    CPC ............ *A42B 3/0453* (2013.01); *B60Q 1/2676* (2013.01); *B60Q 1/444* (2013.01)

(58) Field of Classification Search
    USPC ................. 340/441, 479, 432, 467, 463, 473; 362/105, 106
    See application file for complete search history.

(56) References Cited

U.S. PATENT DOCUMENTS

| | | | |
|---|---|---|---|
| 4,956,752 A * | 9/1990 | Foglietti ........................ 362/473 |
| 6,439,733 B1 * | 8/2002 | Fischer et al. ................ 362/106 |
| 6,558,016 B1 | 5/2003 | Restauro |
| 6,925,654 B2 * | 8/2005 | De Silva ........................... 2/108 |
| 8,009,031 B2 * | 8/2011 | Pacheco et al. ............... 340/479 |
| 8,608,333 B2 * | 12/2013 | Lombard ...................... 362/106 |
| 2002/0145864 A1 | 10/2002 | Spearing |
| 2004/0008106 A1 * | 1/2004 | Konczal ........................ 340/432 |
| 2004/0156215 A1 | 8/2004 | Wooldridge |
| 2004/0177428 A1 | 9/2004 | Maese |
| 2005/0134439 A1 * | 6/2005 | Moore et al. .................. 340/432 |
| 2006/0012471 A1 * | 1/2006 | Ross et al. .................... 340/479 |
| 2006/0291193 A1 | 12/2006 | Hill |
| 2007/0063831 A1 * | 3/2007 | Perkins et al. ................ 340/479 |
| 2008/0089056 A1 | 4/2008 | Grosjean |
| 2009/0021365 A1 * | 1/2009 | Hurwitz ........................ 340/479 |
| 2009/0034238 A1 | 2/2009 | Hurwitz |
| 2010/0124049 A1 | 5/2010 | Fabian |
| 2010/0253501 A1 * | 10/2010 | Gibson ......................... 340/475 |

FOREIGN PATENT DOCUMENTS

| | | |
|---|---|---|
| DE | 2 032 689 | 1/1972 |
| DE | 296 17 877 | 1/1997 |
| DE | 200 13 002 | 12/2000 |
| WO | WO 86/01379 | 3/1986 |
| WO | WO 2005/020731 | 3/2005 |

* cited by examiner

*Primary Examiner* — Phung Nguyen
(74) *Attorney, Agent, or Firm* — Revolution IP, PLLC

(57) ABSTRACT

A method for lighting up a luminous safety accessory includes separating the two sets of luminous sources such that they are each visible based on a different direction; separately lighting up the two sets of luminous sources; lighting up the first set of luminous sources in response to a positive acceleration, with the lighting involving the varying of the luminous intensity of the sources based on the measured acceleration; and lighting up the second set of luminous sources in response to a negative acceleration of which the absolute value exceeds a pre-determined threshold value, with the lighting involving the varying of the luminous intensity of the sources based on the measured acceleration.

18 Claims, 6 Drawing Sheets

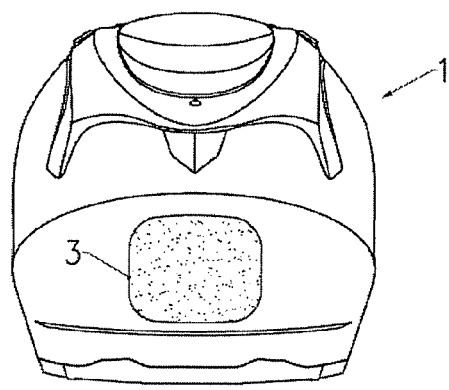
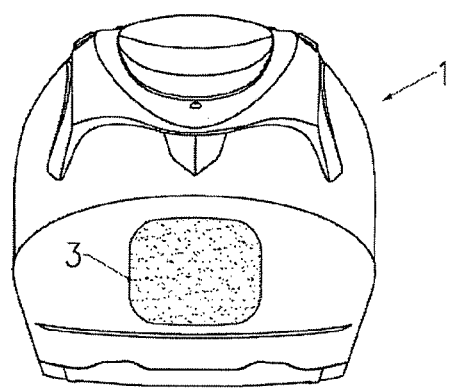
Fig.2a    Fig.2b
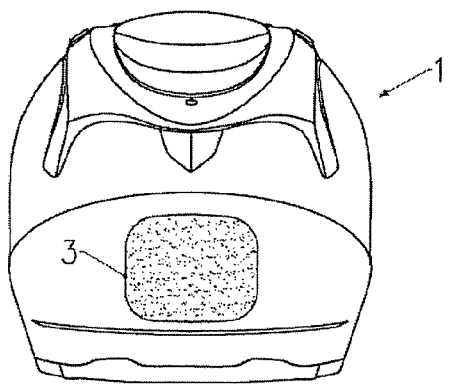
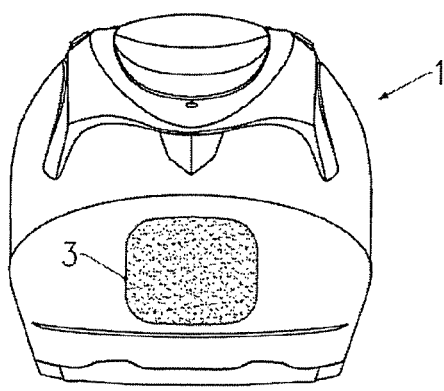
Fig.2c    Fig.2d
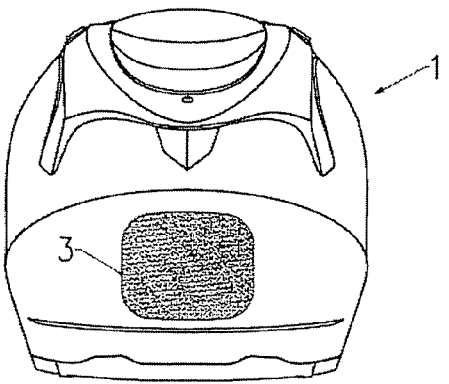
Fig.2e

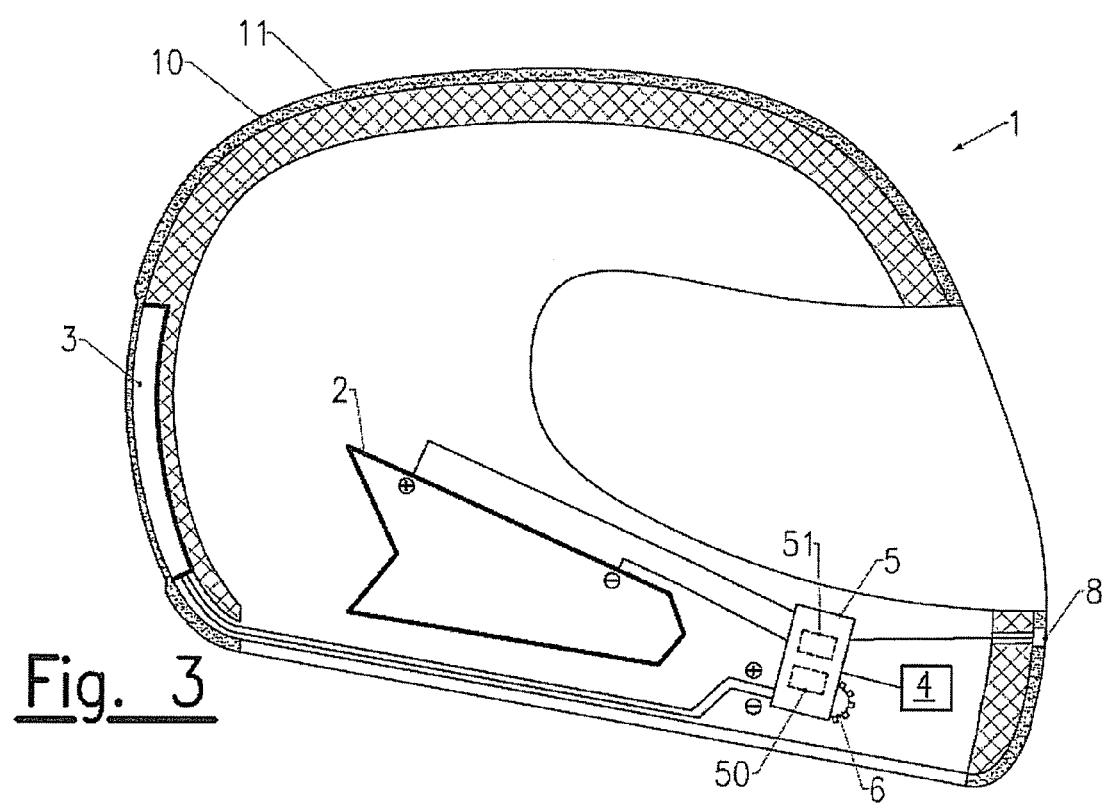

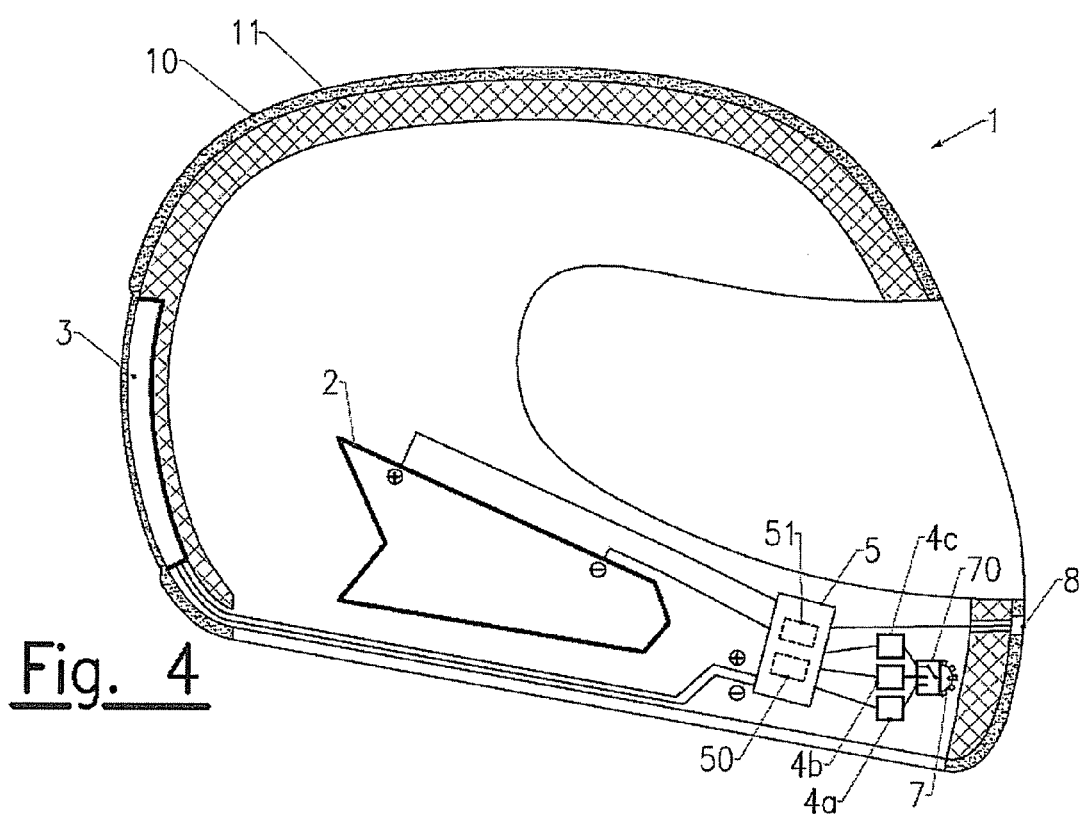

METHOD FOR LIGHTING UP A LUMINOUS SAFETY ACCESSORY

CROSS-REFERENCE TO RELATED APPLICATIONS

This application claims the benefit of French Application No. 1000128901, filed Nov. 3, 2011, in the Institut National De La Propriété Industrielle, the disclosure of which is incorporated herein by reference.

BACKGROUND OF THE INVENTION

1. Field of the Invention

The purpose of the invention is a method to light up a luminous safety accessory as well as such an accessory.

It relates to the technical field of luminous accessories for improving the safety of users wearing them, especially motorcyclists, cyclists, skiers, riders, users of jet-ski, quads or others, and more specifically any sport or leisure activity that requires wearing a protective helmet or clothing.

2. Description of the Related Art

The luminous accessories meant to improve the safety of users wearing them are well known in prior arts and are, for example, described in the following patent documents: US2007063831 (PERKINS), US2002145864 (RALIEGH), US2004156215 (WOOLDRIGE), US2004177428 (MAESE), US2006291193 (HILL), US2010124049 (FABIAN), US20100253501 (DELVONO), U.S. Pat. No. 6,558,016 (RESTAURO), US20080889056 (GROSJEAN), US2009021365 (HURWITZ), US2009034238 (NITE GLOW), US2004008106 (KONCZAL), DE29617877 (HERRMANN), DE20013002 (STEINHAUSER), DE2032689 (EICKS), WO2005020731 (GOLAN), WO8601379 (EBERT).

The document WO2011/061663 (ALESSANDRINI) especially informs us about a motorcyclist jacket on which two sets of luminous sources are fixed. An accelerometer is used to measure the negative accelerations of the biker (deceleration or braking). The signals sent by this accelerometer are converted into lighting instructions sent to all the sets of luminous sources. If the value measured by the accelerometer exceeds an initial pre-determined threshold value, the first set of luminous sources is lit-up. If a value measured by the accelerometer exceeds a second threshold value, the second set of luminous sources is lit-up. This lighting method is not fully satisfactory since it is not possible to draw the attention of other drivers except in the case of braking. This is not enough to correctly alert the other drivers about the presence of a motorcyclist.

The aim of the invention is to remedy this state of things. Especially, one purpose of the invention is to propose a method that allows more efficient lighting up of a luminous accessory in order to increase the safety margin of the user wearing it.

Another purpose of the invention is to propose a luminous accessory that improves the safety of the user wearing it and which has a design that is simple and not onerous.

SUMMARY OF THE INVENTION

The solution proposed by the invention is a method for lighting up a luminous safety accessory, wherein the said accessory comprises a support structure designed to be worn by a user with a first set of luminous sources arranged in the said support structure to be visible according to a first direction, and a second set of luminous sources arranged in the said support structure to be visible according to a second direction.

The said method consists of measuring the accelerations of the user wearing the support structure, and generating lighting instructions to all the luminous source units based on the measured accelerations.

This method is outstanding in that it comprises steps consisting in separating the two sets of luminous sources such that they are each visible based on a different direction, separately lighting up the two sets of luminous sources, lighting up the first set of luminous sources in response to a positive acceleration, with the lighting involving the varying of the luminous intensity of the said sources based on the said measured acceleration, and lighting up the second set of luminous sources in response to a negative acceleration of which the absolute value exceeds a pre-determined threshold value, with the lighting involving the varying of the luminous intensity of the said sources based on the said measured acceleration.

Therefore, it is now envisaged to light up the accessory not only during the braking phases, but also during the acceleration phases. The periods during which the accessory is illuminated are therefore increased and made more attractive, which considerably improves the safety of the user. The separate and guided lighting of the sets of luminous sources as well as their separate direction, act in synergy to generate signals that will be different depending on whether the user is in braking phase or in acceleration phase. Other persons who are in the vicinity of the user can thus adapt their behaviour depending on the intensity of the luminous signal that they will receive.

Other remarkable characteristics of the lighting up method, which is the subject of the invention, are listed below, where each one of these characteristics can be considered alone or in combination with the outstanding characteristics defined above.

The luminous intensity of the luminous sources of the first set and of the second set is made to vary sequentially based on the measured accelerations.

The luminous intensity of the luminous sources of the first set and of the second set is made to vary continuously based on the measured accelerations.

The lighting of the luminous sources of the first set and of the second set consists of luminous animations, the sequences of which are modified based on the measured accelerations.

Another aspect of the invention relates to a luminous safety accessory comprising a support structure designed to be worn by a user, a first set of luminous sources arranged in the support structure so as to be visible in accordance with the first direction, a second set of luminous sources arranged in the support structure so as to be visible in accordance with the second direction, at least one accelerometer mounted on the support structure so as to measure the accelerations of the user wearing the said support structure, where the said accelerometer sends electric signals the intensity of which is proportional to the measured acceleration, and a processing device mounted on the support structure and connected on the one hand to the accelerometer and on the other hand to the first and second sets of the luminous sources, where the said processing device is configured to convert the signals sent by the said accelerometer into lighting instructions for sending to the said sets.

This accessory is remarkable in the sense that the two sets of luminous sources are separated such that they are each visible based on a different direction, lighting up of the second set of luminous sources is independent of the lighting up of the first set of luminous sources, The processing device is configured for sending lighting instructions to the first set of luminous sources in response to a positive acceleration measurement, where the lighting instructions involve the varying of the luminous intensity of the said sources based on the measured acceleration, and sending lighting instructions to the second set of luminous sources in response to a negative acceleration measurement, where the lighting instructions involve the varying of the luminous intensity of the said sources based on the measured acceleration.

Other remarkable characteristics of the accessory, which is the subject of the invention, are listed below, where each one of these characteristics can be considered alone or in combination with the outstanding characteristics defined above are the processing device is configured to send lighting instructions consisting in luminous animations, the sequences of which are modified as soon as the absolute value of the measured acceleration exceeds the pre-determined threshold values, the processing device comprises a processor associated with a memory zone containing instructions which, when they are executed, control the said processor to send the lighting instructions, and the accelerometer is configured to measure the user's accelerations along at least two axes.

A device to adjust the sensitivity of the accelerometer is mounted on the support structure, with the said adjustment device arranged on the said structure such that it can be activated manually by the user wearing the said structure.

The support structure integrates several accelerometers having different ranges of sensitivities. One device to select the said accelerometers is mounted on the said support structure; the said selection device is arranged on the said structure so as to be able to be manually activated by the user wearing the said structure.

A switch to activate or deactivate the first set of luminous sources and/or the second set of luminous sources is mounted on the support structure, with the said switch arranged on the said structure such that it can be activated manually by the user wearing the said structure.

The luminous sources of each set comprise LEDs linked to optical fibres connected to a reflecting polymer film.

Each set of luminous sources consist in a flexible film comprising luminous points appearing in the form of pixels.

The support structure is a piece of clothing with sleeves. The first set of luminous sources are located in the front of the said piece of clothing or on its sleeves, and the second set of luminous sources is located on the back of the said piece of clothing.

The support structure is a protective helmet. The first set of luminous sources is located in the front of the said helmet and/or on the sides, and the second set of luminous sources is located at the rear side of the said helmet.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2a to 2e depict a motorcycle crash helmet seen in the rear view, and which show an example of the lighting scenarios of the second set of luminous sources;

FIG. 3 is the helmet's sectional view of FIGS. 1a to 1e, showing a layout of the various components according to a first mode of execution;

FIG. 4 is the helmet's sectional view of FIGS. 1a to 1e, showing a layout of the various components according to a second mode of execution;

DETAILED DESCRIPTION OF THE EMBODIMENTS

Figure 1A:
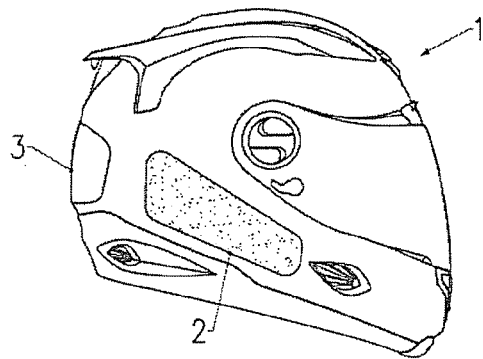
FIGS. 1a to 1e depict a motorcycle crash helmet seen in the side view, and which show an example of the lighting scenarios of the first set of luminous sources.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The method, which is the subject of the invention, is applicable to lighting up the motorcycle or cycle helmets, ski helmets, riding helmets, clothing for motorcycling, bicycling, skiing, horse riding sports, and in general, for lighting up any safety accessory designed to be worn by a user who is not protected by a compartment. The aim is to effectively light up this accessory such that the user who is wearing it can quickly signal his presence to the other persons around him. For the purpose of clarity and simplification, the following description refers only to a protective helmet and specifically to a motorcycle helmet, without this being deemed to be exhaustive.

While referring to FIGS. 1a to 2c, the helmet 1 comprises a support structure 10, 11 designed to be worn by a motorcyclist. A first set of luminous sources 2 is arranged in the structure of the helmet 1 so as to be visible in accordance with the first direction. In practice, this first set is located on the sides and/or in the front of the helmet 1, under the rigid outer shell, at the level of its translucent zone. Thus, when the first set 2 is lit, the emitted luminous signal is suitable to be reflected in the rear-view mirrors of the other drivers who are in the front or on the side of the biker and are alerted to his presence. These drivers can therefore anticipate their reaction and/or adapt their driving in relation to the motorcyclist.

A second set of luminous sources 3 is arranged in the structure of the helmet 1 so as to be visible in accordance with the second direction. In practice, this second set is located on the rear of the helmet 1, under the rigid outer shell, at the level of its translucent zone. Thus, when the second set 3 is lit, the emitted luminous signal is visible to the other drivers who are behind the biker. These drivers can therefore again anticipate their reaction and/or adapt their driving in relation to the motorcyclist.

In the case of a clothing with sleeves (e.g.: a motorcycle's jacket, ski jacket, cycle jacket etc.), the first set 2 is favourably located in the front of the said clothing or on its sleeves, and the second set 3 is favourably located on the back of the said clothing.

The various sets 2, 3 are separated from each other such that they are each visible following a different direction. Of course, it is possible to plan more than two sets of luminous sources, with each of these being located following a different direction. The result that is obtained is that the helmet 1 is visible by a large number of persons, and not only those who are behind the user as is generally the case with accessories of the prior art.

The luminous sources of each set 2, 3 preferably consist of LEDs and more specifically of LEDs linked to optical fibres connected to a reflecting polymer film. Thus, we get a thin and flexible luminous film, not cumbersome, and which can be easily adapted to the shapes of the support structure 10, 11. Such luminous films are, for example, described in patent documents U.S. Pat. No. 5,312,569 (MEZEI) and U.S. Pat. No. 5,499,912 (MEZEI). Each set 2, 3 of luminous sources can also consist of a flexible film comprising luminous points appearing in the form of pixels, for example of the LCD flexible screen type.

This last solution is used to create animations on the flexible film that may be customisable. The luminous sources of the first 2 and/or the second set 3, can be dependent on each other (i.e. they are all lit and switched off at the same time), or independent of each other (i.e. they can each be lit or switched off individually). The luminous sources can be of different colour, or suitable for emitting lights of different colours. Their luminous intensity can also be changed. For this reason, the LED technology is preferred. For example, it is possible to envisage that the luminous sources of the first set 2 light up in a gamut of colours ranging from blue to green and those of the second set 3 light up in a gamut of colours ranging from orange to red.

Lighting up of the helmet 1 is based on the measurement of accelerations of the motorcyclist wearing it, and the generation of lighting instructions sent to the sets of light sources 2, 3 based on the measured positive or negative accelerations. In order to do this, with reference to FIG. 3, at least one accelerometer 4 is mounted on the structure of the helmet 1 so as to measure the motorcyclist's accelerations. In practice, this accelerometer 4 is integrated in the front part of the helmet 1. It is configured to measure the linear accelerations (positive or negative) of the motorcyclist along at least two axes (preferably the forward movement axis X of the motorcycle and axis Y located in the same horizontal plane as axis)(but perpendicular to it) and preferably also along a third axis (the vertical axis Z, orthogonal to axes X and Y).

Thus, irrespective of the position and orientation of the motorcyclist's head, his acceleration is measured correctly.

The accelerometer 4 sends electrical signals the intensity of which is proportional to the measured positive or negative acceleration.

A processing device 5 is mounted in the support structure 10, 11. This processing device 5 is connected on the one hand to the accelerometer 4 and on the other hand to the first 2 and second 3 sets of luminous sources. In accordance with the measured accelerations, the processing device 5 sends lighting instructions to the luminous sets. In practice, the processing device 5 consists of an electronic management unit mounted on a printed circuit board and comprising a memory zone 50 in which the instructions are saved and a processor 51. When the unit is called upon by the accelerometer 4, the instructions are executed by the processor 51 so as to convert the electrical signals sent by the said accelerometer into lighting instructions meant for the sets 2, 3. More specifically and in compliance with the invention, the instructions saved in the memory zone 50 are used to light up the first set 2 in response to a positive acceleration (pure acceleration), with the lighting consisting of varying of the luminous intensity of the luminous sources of the said first set based on the said measured acceleration, and light up the second set 3 in response to a negative acceleration (or deceleration), with the lighting consisting of varying of the luminous intensity of the luminous sources of the said second set based on the said measured acceleration.

Moreover, the instructions are used to light up both sets 2, 3 of luminous sources independently. If the accelerometer 4 detects a positive acceleration, then the processing device 5 lights up only the first set 2.

And if the accelerometer 4 detects a negative acceleration, then the processing device 5 lights up only the second set 3.

Figure 1B:
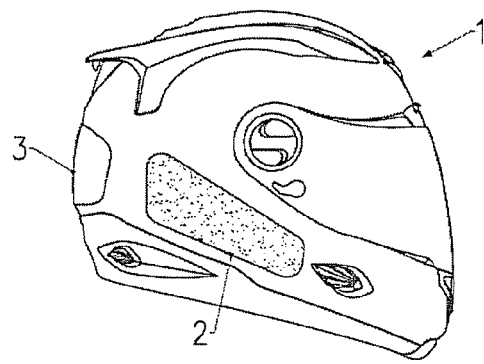
Figure 1C:
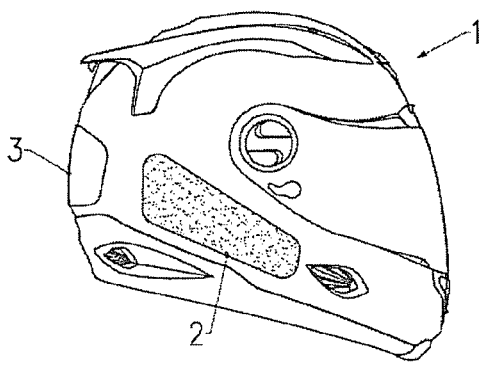
Figure 1D:
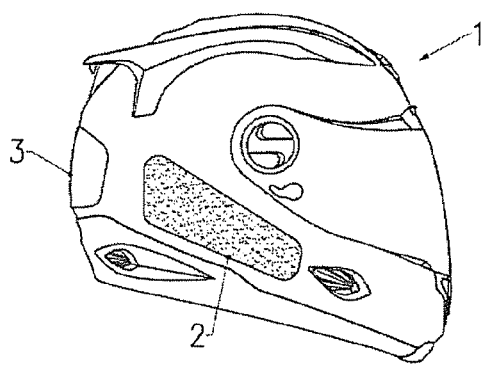
Figure 1E:
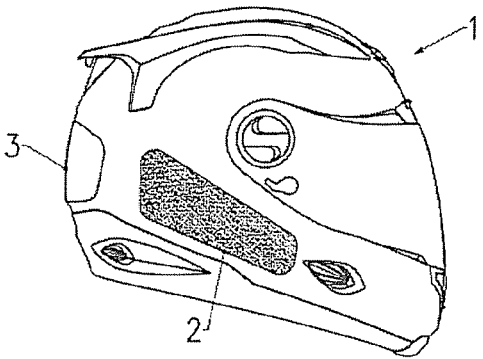
Figure 5:
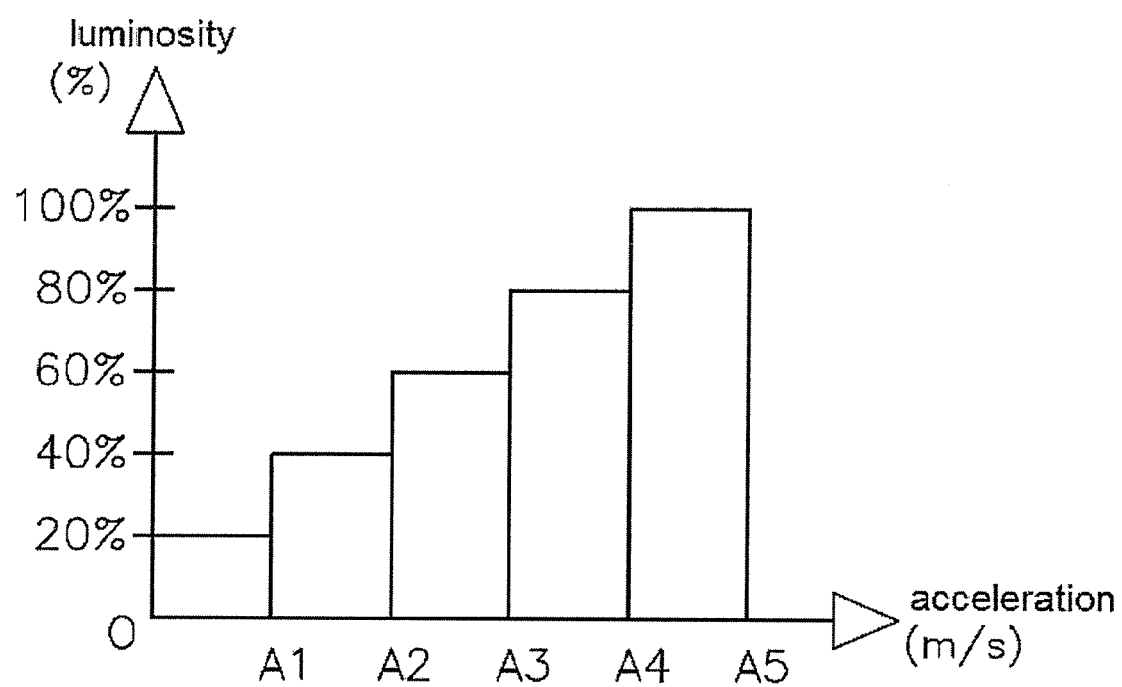
FIG. 5 is a diagram illustrating a possible scenario for lighting up the luminous sources.

FIGS. 1*a* to 1*e*, 2*a* to 2*e* and 5 show an animation where the luminous intensity of luminous sources of the sets 2, 3, varies sequentially based on the measured acceleration (positive or negative). Five luminous sequences are envisaged. When the absolute value of the measured acceleration (positive or negative), falls between 0 m/s and a pre-determined first value "A1" m/s, then the luminous intensity of each luminous source is, for example, equal to 20% of the maximum intensity (the luminous sources are always lit) (FIGS. 1*a* and 2*a*). When the absolute value of the measured acceleration lies between the first value "A1" m/s and a pre-determined second value "A2" m/s, then the luminous intensity of the luminous sources is equal to 40% of the maximum intensity. This, for example, pertains to a slight acceleration or slight braking generally without risk, and which is signalled by a moderate luminous intensity (FIGS. 1*b* and 2*b*). When the absolute value of the measured acceleration lies between the second value "A2" m/s and a pre-determined third value "A3" m/s, then the luminous intensity of the luminous sources is equal to 60% of the maximum intensity. This, for example, pertains to an average, potentially dangerous acceleration or braking, and which is signalled by a sustained luminous intensity (FIGS. 1*c* and 2*c*). When the absolute value of the measured acceleration lies between the third value "A3" m/s and a pre-determined fourth value "A4" m/s, then the luminous intensity of the luminous sources is equal to 80% of the maximum intensity. This, for example, pertains to a sudden acceleration or braking, and which is signalled by a strong luminous intensity (FIGS. 1*d* and 2*d*). When the absolute value of the measured acceleration lies between the fourth value "A4" m/s and a pre-determined fifth value "A5" m/s, then the luminous intensity of the luminous sources is equal to 100% of the maximum intensity. This, for example, pertains to a dangerous emergency acceleration or braking, and which is signalled by a very strong luminous intensity (FIGS. 1*e* and 2*e*).

This sequential illumination is especially effective since it allows emitting highly marked light signals meant for other users. These other users are immediately alerted when the luminous intensity suddenly increases from one threshold to another.

Values A1, A2, A3, A4 and A5 can be different depending on whether the accelerometer 4 detects an acceleration or a deceleration.

Figure 6:
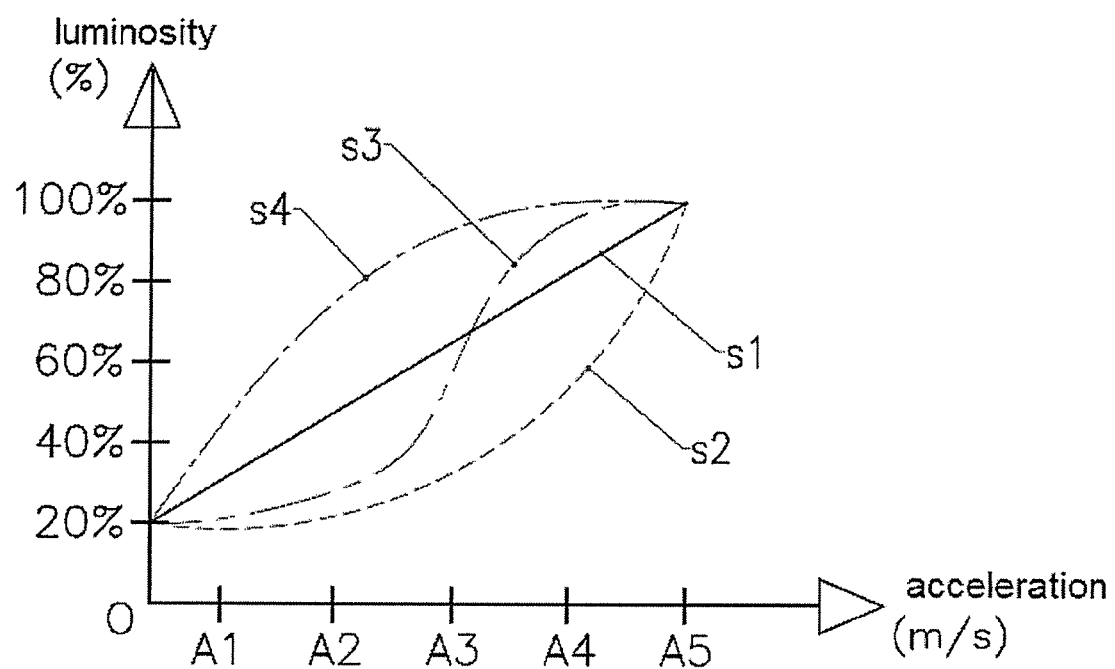
FIG. 6 is a diagram illustrating another possible scenario for lighting up the luminous sources.

FIG. 6 shows another animation where the luminous intensity of luminous sources of the sets 2, 3, varies continuously, which could be linear (graph s1) or not (graphs s2 to s4) based on the measured accelerations (positive or negative).

In a variant of non-represented execution, the processing device 5 is suitable for emitting lighting instructions (regarding intensity and/or colour) consisting of luminous animations of which the sequences are modified based on the measured accelerations. For example, the sequences of the animations can be changed as soon as the absolute value of the measured acceleration (positive or negative) overshoots the thresholds of pre-determined values (e.g.: 0-A1; A1-A2; A2-A3; A3-A4; A4-A5). "Animation" means that the luminous sources of a set 2, 3, are each lit in accordance with a defined programme to get a visual effect that changes with each sequence. Other scenarios can be envisaged such as stroboscopic lighting wherein the frequencies are faster or slower depending on the measured acceleration.

Depending on the application (motorcycling in the city or on highway, using a small capacity or a large capacity motorcycle, bicycling, skiing, horse riding etc.), the accelerations are not the same. Thus it is advantageous to be able to adjust the sensitivity of the accelerometer 4 according to the application. According to a first mode of execution sketched in FIG. 3, a device for adjusting 6 the sensitivity of the accelerometer 4 is mounted on the support structure 10, 11.

In practice, it is a potentiometer type button, arranged in the internal foam liner 11, under the outer shell 10, so as to be able to be manually activated by the user. Different positions are envisaged depending on the type of application. This button is, for example, placed at the level of the maxillo-facial protection of the helmet 1. The adjustment device 6 is connected to the processing device 5 so as to select a sensitivity range of the accelerometer 4.

In a variant of the execution sketched in FIG. 4, the support structure 10, 11 integrates several accelerometers 4a, 4b, 4c having different sensitivity ranges. The first accelerometer 4a is, for example, suitable for low accelerations (0.5 G to +/−2G), a second accelerometer 4b for medium accelerations (+/−2G to +/−4G) and a third accelerometer 4c for high accelerations (+/−4G to +/−6G). A device is planned to select the accelerometers, and the said device is mounted on the support structure 10, 11 such that it can be manually activated by the user. In practice, it is a potentiometer type button 7, arranged in the internal foam liner 11, under the outer shell 10, so as to be able to be manually activated by the user. Different positions are planned depending on the accelerometer 4a, 4b or 4c to be selected. This button is, for example, placed at the level of the maxillo-facial protection of the helmet 1. This button is linked to a switch 70 that is used to select the accelerometer corresponding to the adjustment of the said button.

According to a favourable characteristic of the invention, a switch (not shown) is envisaged to activate or deactivate the first 2 and/or the second 3 set of luminous sources. This switch is mounted on the support structure 10, 11, and is arranged such that it can be manually activated by the user. This switch can, for example, consist in one button offering several positions: a first stop position where neither of the luminous sets 2, 3, are likely to be lit; an active position where the luminous sets 2 and/or 3 are likely to be lit; and an intermediate position where only the first set 2 is likely to be lit as the second set 3 is deactivated.

This last position is especially used when the user is carrying a passenger who may be disturbed by the lighting of the second set 3.

With reference to FIGS. 3 and 4, a light sensor 8 is mounted on the support structure 10, 11. This sensor 8 is linked to the processing device 5 and is used to disconnect the luminous assemblies 2, 3 when the ambient light is too high to make the lighting visible or effective.

All the components described earlier are electrically powered by an electric power supply (not shown) integrated in the support structure 10, 11. This electric supply typically consists of lithium accumulators of which the maximum voltage corresponds to the safety standards in force. These accumulators are rechargeable by connecting to an external voltage regulating transformer. A dedicated connection plug is, in fact, favourably planned in the support structure 10, 11.

The manufacturing process of the helmet 1 sketched in the appended figures, is moulding of the outer shell 10. Preferably composite materials are used (glass fibres+resin), injected polycarbonate, or any other equivalent material. The injected composite or polycarbonate materials are translucent. It is advantageous to plan layers of least thickness at the level of areas to be lit, so as to improve the transparency, positioning stencils on the outer shell 10 at the level of zones to be lit. Thus, reserved areas are created for preparation of the outer shell 10 for painting it, painting of the outer shell 10, removal of the stencils so as to reveal the transparent reserved areas, varnishing of the outer shell 10, for application of decorations by placing silk screen printed transfers. For the reserved areas, silk screen printed transfers are applied with transparent areas to allow light to pass, possibly, second varnishing of the decorated outer shell 10, placement of the internal foam liner 11. All the components described earlier are integrated between the outer shell 10 and the internal foam liner 11 in polystyrene. The foam liner 11 is a part obtained by moulding, and which has housings specifically dedicated to the various components.

It is understood that the various steps of this manufacturing process are independent from the type of lighting instructions likely to be generated by the processing device 5.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for lighting up a luminous safety accessory, wherein said accessory comprises a support structure designed to be worn by a user with a first set of luminous sources arranged in said support structure to be visible according to a first direction, and a second set of luminous sources arranged in said support structure to be visible according to a second direction, where said method consists of measuring the accelerations of the user wearing the support structure, and generating lighting instructions for sending to all the sets of luminous sources based on the measured accelerations, said method comprises the steps consisting of:
   separating the two sets of luminous sources such that they are each visible based on a different direction,
   separately lighting up the two sets of luminous sources,
   lighting up the first set of luminous sources in response to a positive acceleration, with the lighting involving the varying of the luminous intensity of said sources based on said measured acceleration, and
   lighting up the second set of luminous sources in response to a negative acceleration of which the absolute value exceeds a pre-determined threshold value, with the lighting involving the varying of the luminous intensity of said sources based on said measured acceleration,
   wherein the lighting of the luminous sources of the first set and of the second set consists of luminous animations, the sequences of which are modified based on the measured accelerations.

2. The method according to claim 1, in which the luminous intensity of the luminous sources of the first set and of the second set is made to vary sequentially based on the measured accelerations.

3. The method according to claim 1, in which the luminous intensity of the luminous sources of the first set and of the second set is made to vary continuously based on the measured accelerations.

4. A luminous safety accessory comprising:
   a support structure designed to be worn by a user,
      a first set of luminous sources arranged in the support structure so as to be visible in accordance with the first direction, a second set of luminous sources arranged in the support structure so as to be visible in accordance with the second direction, at least one accelerometer mounted on the support structure so as to measure the accelerations of the user wearing the support structure, where the accelerometer sends electric signals the intensity of which is proportional to the measured acceleration, and a processing device mounted on the support structure and connected on the one hand to the accelerometer and on the other hand to the first and second sets of the luminous sources, where the processing device is configured to convert the signals sent by the accelerometer into lighting instructions for sending to the sets, wherein, the two sets of luminous sources are separated such that they are each visible based on a different direction, with the two said sets being lit independently, lighting up of the second set of luminous sources is independent of the lighting up of the first set of luminous sources, and the processing device is configured for:
sending lighting instructions to the first set of luminous sources in response to a positive acceleration measurement, where the lighting instructions involve the varying of the luminous intensity of the sources based on the measured acceleration, sending lighting instructions to the second set of luminous sources in response to a negative acceleration measurement, where the lighting instructions involve the varying of the luminous intensity of the sources based on the measured acceleration, wherein the processing device is configured to send lighting instructions comprising luminous animations, the sequences of which are modified as soon as the absolute value of the measured acceleration exceeds the pre-determined threshold values (0-A1; A1-A2; A2-A3; A3-A4; A4-A5).

5. The accessory according to claim 4, wherein the processing device comprises a processor associated with a memory zone containing instructions which, when they are executed, control the processor to send lighting instructions.

6. The accessory according to claim 4, wherein, the accelerometer is configured to measure the user's accelerations along at least two axes.

7. The accessory according to claim 4, wherein a device to adjust the sensitivity of the accelerometer is mounted on the support structure, with the adjustment device arranged on the structure such that the user wearing the structure activates manually.

8. The accessory according to claim 4, wherein the support structure integrates several accelerometers having different ranges of sensitivity, one device to select the accelerometers is mounted on the support structure; the selection device is arranged on the structure so as to be able to be manually activated by the user wearing the structure.

9. The accessory according to claim 4, wherein a switch to activate or deactivate the first set of luminous sources and/or the second set of luminous sources is mounted on the support structure, with the switch arranged on the structure such that the user wearing the structure activates manually.

10. The accessory according to claim 4, wherein the luminous sources of each set comprise LEDs linked to optical fibers connected to a reflecting polymer film.

11. The accessory according to claim 4, wherein each set of luminous sources consist of a flexible film comprising luminous points appearing in the form of pixels.

12. The accessory according to claim 4, wherein,
the support structure is a piece of clothing with sleeves,
the first set of luminous sources are located in front of the piece of clothing or on its sleeves, and
the second set of luminous sources is located on the back of the piece of clothing.

13. The accessory according to claim 4, wherein,
the support structure is a protective helmet,
the first set of luminous sources is located in front of the helmet and/or on its sides, and
the second set of luminous sources is located on the rear of the helmet.

14. The accessory according to claim 4, wherein, the accelerometer is configured to measure the user's accelerations along at least two axes.

15. The accessory according to claim 4, wherein a device to adjust the sensitivity of the accelerometer is mounted on the support structure, with the adjustment device arranged on the structure such that it can be manually activated by the user wearing the structure activates manually.

16. The accessory according to claim 4, wherein the support structure integrates several accelerometers having different ranges of sensitivity, one device to select the accelerometers is mounted on the support structure; the selection device is arranged on the structure so as to be able to be manually activated by the user wearing the structure.

17. The accessory according to claim 4, wherein a switch to activate or deactivate the first set of luminous sources and/or the second set of luminous sources is mounted on the support structure, with the switch arranged on the structure such that the user wearing the structure activates manually.

18. The accessory according to claim 4, wherein each set of luminous sources consist of a flexible film comprising luminous points appearing in the form of pixels.

* * * * *